United States Patent
Ghosh et al.

(10) Patent No.: US 12,452,169 B2
(45) Date of Patent: Oct. 21, 2025

(54) POWER OPTIMIZATION USING DYNAMIC BANDWIDTH MANAGEMENT BETWEEN CONNECTED NETWORK DEVICES

(71) Applicant: Juniper Networks, Inc., Sunnyvale, CA (US)

(72) Inventors: Sandip Kumar Ghosh, Bangalore (IN); Jonathan C. Barth, Collegeville, PA (US); Srihari Ramachandra Sangli, Bengaluru (IN)

(73) Assignee: Juniper Networks, Inc., Sunnyvale, CA (US)

( * ) Notice: Subject to any disclaimer, the term of this patent is extended or adjusted under 35 U.S.C. 154(b) by 4 days.

(21) Appl. No.: 18/647,362

(22) Filed: Apr. 26, 2024

(65) Prior Publication Data

US 2025/0106146 A1 Mar. 27, 2025

(30) Foreign Application Priority Data

Sep. 26, 2023 (IN) .............................. 202341064503

(51) Int. Cl.
*H04L 45/00* (2022.01)
*G06F 1/28* (2006.01)
(Continued)

(52) U.S. Cl.
CPC ................ *H04L 45/70* (2013.01); *G06F 1/28* (2013.01); *G06F 1/3206* (2013.01);
(Continued)

(58) Field of Classification Search
CPC ......... H04L 45/70; H04L 45/03; H04L 12/12; H04L 41/0622; H04L 41/0627;
(Continued)

(56) References Cited

U.S. PATENT DOCUMENTS 8,340,111 B1 * 12/2012 Krivitski ............... H04L 41/344
370/419
9,606,604 B1    3/2017 Butter
(Continued)

FOREIGN PATENT DOCUMENTS

CN 116017782 A 4/2023
EP  4061063 A1 9/2022
(Continued)

OTHER PUBLICATIONS

Ethernet Switching User Guide, Juniper Networks, Website: https://standards.ieee.org/ieee/802.1AB/6047/, Dec. 14, 2023, 1158 Pages.
(Continued)

*Primary Examiner* — Glenton B Burgess
*Assistant Examiner* — Jihad K Boustany
(74) *Attorney, Agent, or Firm* — Harrity & Harrity, LLP

(57) ABSTRACT

A first network device may create a port group for a plurality of links directly connected to a second network device, and may select the first network device as a controller network device and the second network device as a worker network device. The first network device may rank the plurality of links of the port group to generate a list of ranked links, and may select, from the list of ranked links, a highest ranked link as a control channel. The first network device may power off one or more of the plurality of links, except the control channel, based on one of a configuration, a policy, or a traffic prediction, and may identify a termination of a time period associated with powering off the one or more of the plurality of links. The first network device may power on the one or more of the plurality of links based on the termination of the time period.

20 Claims, 9 Drawing Sheets

(51) Int. Cl.
| | |
|---|---|
| *G06F 1/3206* | (2019.01) |
| *G06F 1/3234* | (2019.01) |
| *H04L 12/12* | (2006.01) |
| *H04L 41/0604* | (2022.01) |
| *H04L 41/069* | (2022.01) |
| *H04L 43/10* | (2022.01) |
| *H04L 45/02* | (2022.01) |
| *H04L 45/03* | (2022.01) |
| *H04L 45/12* | (2022.01) |
| *H04L 45/24* | (2022.01) |
| *H04L 45/28* | (2022.01) |
| *H04L 47/10* | (2022.01) |
| *H04L 47/12* | (2022.01) |
| *H04L 47/125* | (2022.01) |
| *H04W 52/02* | (2009.01) |
| *G06Q 30/018* | (2023.01) |

(52) U.S. Cl.
CPC .......... *G06F 1/3234* (2013.01); *H04L 12/12* (2013.01); *H04L 41/0622* (2013.01); *H04L 41/0627* (2013.01); *H04L 41/069* (2013.01); *H04L 43/10* (2013.01); *H04L 45/02* (2013.01); *H04L 45/03* (2022.05); *H04L 45/126* (2013.01); *H04L 45/245* (2013.01); *H04L 45/28* (2013.01); *H04L 47/12* (2013.01); *H04L 47/125* (2013.01); *H04L 47/29* (2013.01); *H04W 52/0235* (2013.01); *H04W 52/0248* (2013.01); *H04W 52/0274* (2013.01); *G06Q 30/018* (2013.01)

(58) Field of Classification Search
CPC ....... H04L 41/069; H04L 43/10; H04L 45/02; H04L 45/126; H04L 45/245; H04L 45/28; H04L 47/12; H04L 47/1258; H04L 47/29; G06F 1/28; G06F 1/3206; G06F 1/3234; H04W 52/0235; H04W 52/0248; H04W 52/0274; G06Q 30/018
See application file for complete search history.

(56) References Cited

U.S. PATENT DOCUMENTS

| | | |
|---|---|---|
| 9,992,129 B2 | 6/2018 | Grosso et al. |
| 2007/0201380 A1 | 8/2007 | Ma et al. |
| 2007/0283178 A1 | 12/2007 | Dodeja et al. |
| 2008/0304519 A1 | 12/2008 | Koenen et al. |
| 2009/0204828 A1 | 8/2009 | Diab et al. |
| 2010/0118753 A1 | 5/2010 | Mandin et al. |
| 2012/0127894 A1* | 5/2012 | Nachum ............... H04L 12/10 370/255 |
| 2013/0003559 A1 | 1/2013 | Matthews |
| 2013/0070754 A1 | 3/2013 | Iovanna et al. |
| 2014/0169176 A1 | 6/2014 | Brock |
| 2014/0372576 A1 | 12/2014 | Mohandas et al. |
| 2015/0208341 A1 | 7/2015 | Mohamed et al. |
| 2015/0312769 A1 | 10/2015 | Shindo |
| 2016/0197784 A1 | 7/2016 | Gandhi et al. |
| 2017/0214539 A1* | 7/2017 | Chu ..................... H04L 49/201 |
| 2018/0241466 A1 | 8/2018 | Inagaki |
| 2019/0163255 A1 | 5/2019 | Dewey et al. |
| 2022/0369403 A1 | 11/2022 | Fang et al. |
| 2023/0062989 A1 | 3/2023 | Kim et al. |
| 2024/0205823 A1 | 6/2024 | Yang et al. |
| 2024/0214313 A1 | 6/2024 | Voit et al. |
| 2024/0333590 A1 | 10/2024 | Pignataro et al. |
| 2024/0422101 A1* | 12/2024 | Sivakumar ......... H04L 43/0817 |
| 2025/0039097 A1* | 1/2025 | Kazimirsky ............ H04L 47/30 |
| 2025/0080464 A1 | 3/2025 | Pignataro et al. |

FOREIGN PATENT DOCUMENTS

| | | |
|---|---|---|
| WO | 2012155987 A1 | 11/2012 |
| WO | 2022228085 A1 | 11/2022 |

OTHER PUBLICATIONS

IEEE Standard for Local and metropolitan area networks, "Station and Media Access Control Connectivity Discovery," IEEE Computer Society, Website: https://www.juniper.net/documentation/us/en/software/junos/useraccess/topics/ref/statement/lldp-edit-protocols.html, 2016, 146 Pages.

Extended European Search Report for European Application No. EP24188097 dated Dec. 18, 2024, 8 pages.

Bierman et al., "A YANG Data Model for Hardware Management," Internet Engineering Task Force (IETF), Request for Comments: 8348, Mar. 2018, 60 Pages.

Bierman et al., "A YANG Data Model for System Management," Internet Engineering Task Force (IETF), Request for Comments: 7317, Aug. 2014, 35 Pages.

Bjorklund et al., "The YANG 1.1 Data Modeling Language," Internet Engineering Task Force (IETF), Request for Comments: 7950, Aug. 2016, 217 Pages.

Bjorklund, M., (Ed.,) "YANG-A Data Modeling Language for the Network Configuration Protocol (NETCONF)," IETF RFC 6020, http://datatracker.ietf.org/doc/rfc6020/, Oct. 2010, 173 pages.

Bonica et al., "Extended ICMP to Support Multi-Part Messages," Network Working Group, Request for Comments:4884, Apr. 2007, 19 Pages.

"Chkirbene, Z., et al., "Efficient Techniques for Energy Saving in Data Center Networks", Computer Communications, Elsevier Science Publishers Bv, Amsterdam, NL, vol. 129, Jul. 29, 2018, pp. 111-124, XP085477963, ISSN: 0140-3664, DOI: 10.1016/J.COMCOM. 2018.07.025".

Dhanuka A., et al., "How to Use Energy Efficient Ethernet (IEEE 802.3az) With Texas Instruments Ethernet PHYs," Texas Instruments, SNLA328-Oct. 2019, 15 Pages.

Extended European Search Report for European Application No. EP24150429.9 dated Jul. 2, 2024, 11 pages.

Extended European Search Report for European Application No. EP24151927 dated Jul. 16, 2024, 10 pages.

Extended European Search Report for European Application No. EP241871235 dated Dec. 6, 2024, 10 pages.

Extended European Search Report for European Application No. EP241877513 dated Dec. 9, 2024, 41 pages.

Ginsberg et al., "Advertising Generic Information in IS-IS," Internet Engineering Task Force (IETF), Request for Comments: Dec. 2010, 11 Pages.

Gupta, M., et al., Dynamic Ethernet Link Shutdown for Energy Conservation on Ethernet Links, IEEE International Conference on Communications (ICC), Jun. 1, 2007, pp. 6156-6161.

IEEE Standards Association., "Station and Media Access Control Connectivity Discovery," IEEE, Jan. 29, 2016, 146 pages.

Junos Os., "User Access and Authentication Administration Guide for Junos OS," Juniper Networks Inc., Jun. 14, 2023, 1786 pages.

Martin R., "IEEE P802.1, Draft 1.0, Bridges and Bridged Networks—Link Aggregation," IEEE 802.1 Working Group, Dec. 2020, Nurnberg, Germany, 349 Pages.

Moy, J., "Extending OSPF to Support Demand Circuits," Network Working Group, Request for Comments: 1793, pp. 1-32, Apr. 1995.

OpenConfig: Platform model, Website: https://openconfig.net/projects/modelsischemadocs/jstree/openconfig-platform.html, Obtained Apr. 30, 2024, 199 Pages.

Website: https://en.wikipedia.org/wiki/Traceroute; Obtained Apr. 25, 2024, 5 Pages.

* cited by examiner

POWER OPTIMIZATION USING DYNAMIC BANDWIDTH MANAGEMENT BETWEEN CONNECTED NETWORK DEVICES

CROSS-REFERENCE TO RELATED APPLICATION

This Patent Application claims priority to India Provisional Patent Application No. 202341064503, filed on Sep. 26, 2023, entitled "SYSTEMS AND METHODS FOR PROVIDING ENERGY EFFICIENT NETWORKS," and assigned to the assignee hereof. The disclosure of the prior Application is considered part of and is incorporated by reference into this Patent Application.

BACKGROUND

An interface or port of a network device includes multiple hardware components (e.g., optics, a laser, a processor, and/or the like) that enable the network device to establish a link with another network device. An interface or port of the other network device also includes the multiple hardware components.

SUMMARY

Some implementations described herein relate to a method. The method may include creating, by a first network device, a port group for a plurality of links directly connected to a second network device, and selecting the first network device as a controller network device and the second network device as a worker network device. The method may include ranking the plurality of links of the port group to generate a list of ranked links, and selecting, from the list of ranked links, a highest ranked link as a control channel. The method may include powering off one or more of the plurality of links, except the control channel, based on one of a configuration, a policy, or a traffic prediction.

Some implementations described herein relate to a first network device. The first network device may include one or more memories and one or more processors. The one or more processors may be configured to create a port group for a plurality of links directly connected to a second network device, and select the first network device as a controller network device and the second network device as a worker network device. The one or more processors may be configured to rank the plurality of links of the port group to generate a list of ranked links, and select, from the list of ranked links, a highest ranked link as a control channel. The one or more processors may be configured to power off one or more of the plurality of links, except the control channel, based on one of a configuration, a policy, or a traffic prediction, and perform a health check on the one or more of the plurality of links based on a health check time period.

Some implementations described herein relate to a non-transitory computer-readable medium that stores a set of instructions. The set of instructions, when executed by one or more processors of a first network device, may cause the first network device to create a port group for a plurality of links directly connected to a second network device, and select the first network device as a controller network device and the second network device as a worker network device. The set of instructions, when executed by one or more processors of the first network device, may cause the first network device to rank the plurality of links of the port group to generate a list of ranked links, and select, from the list of ranked links, a highest ranked link as a control channel. The set of instructions, when executed by one or more processors of the first network device, may cause the first network device to power off one or more of the plurality of links, except the control channel, based on one of a configuration, a policy, or a traffic prediction, and identify a termination of a time period associated with powering off the one or more of the plurality of links. The set of instructions, when executed by one or more processors of the first network device, may cause the first network device to power on the one or more of the plurality of links based on the termination of the time period.

DETAILED DESCRIPTION

Figure 1A:
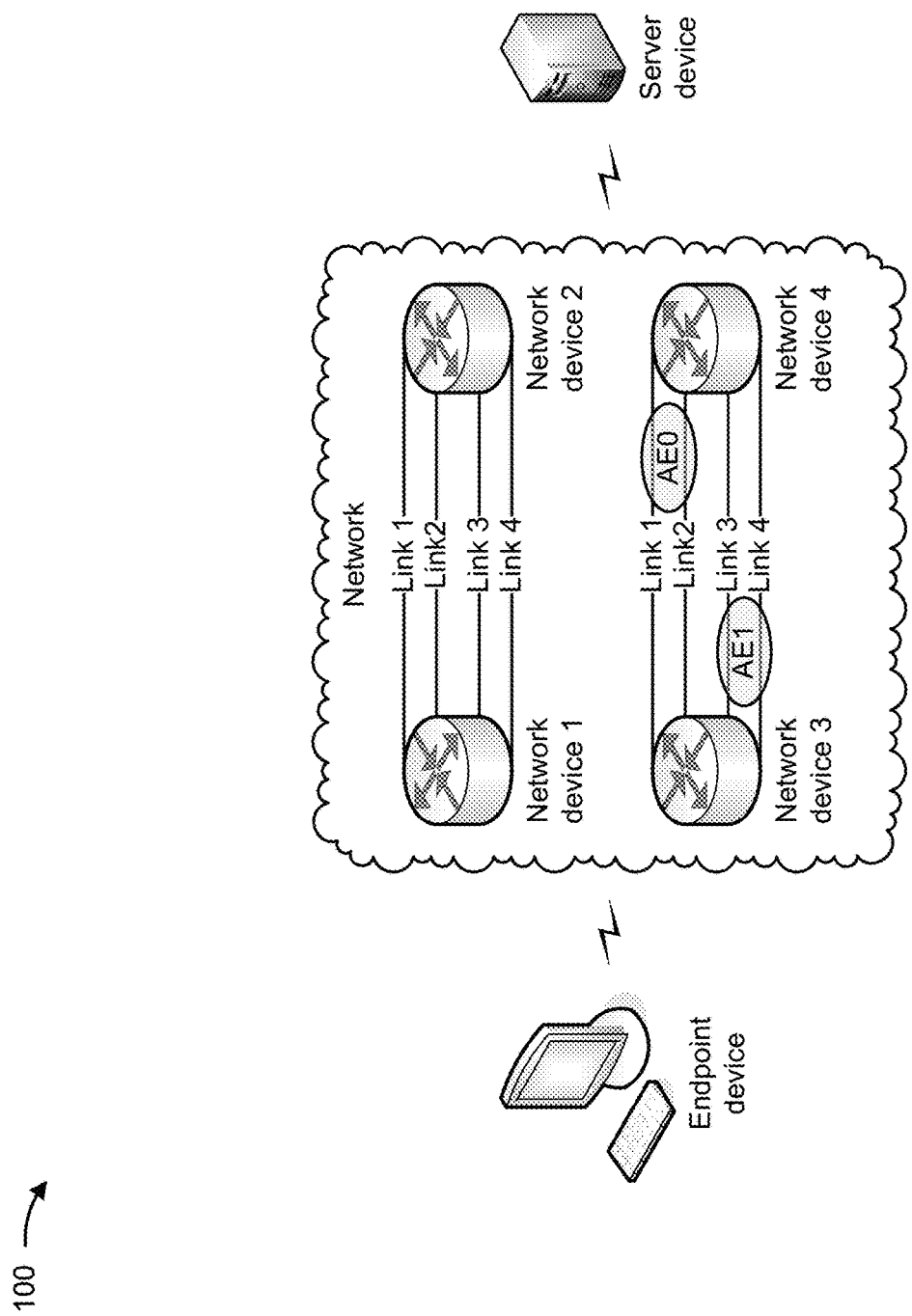
FIGS. 1A-1E are diagrams of an example associated with power optimization using dynamic bandwidth management between connected network devices.

The following detailed description of example implementations refers to the accompanying drawings. The same reference numbers in different drawings may identify the same or similar elements.

The total power required to keep an interface of a network device operational is significant. The interface and the associated hardware components consume significant power even when the interface is in an idle state (e.g., not sending or receiving traffic). For example, a network device with one hundred (100) four-hundred (400) gigabit (G) ports will consume kilowatts (kW) of power for the interfaces alone. Furthermore, when two directly connected network devices are not exchanging traffic, the interfaces of the network devices unnecessarily consume power. Thus, current techniques for managing network devices consume computing resources (e.g., processing resources, memory resources, communication resources, and/or the like), networking resources, and/or the like are associated with failing to adjust power consumption and bandwidth of connected network devices based on a traffic rate, failing to power off interfaces of the connected network device during idle states and wasting power with the idle interfaces, failing to power off the idle interfaces during non-peak utilization times of the connected network devices, unnecessarily maintaining the idle interfaces and unused links during non-peak utilization times of the connected network devices, and/or the like.

Some implementations described herein relate to power optimization using dynamic bandwidth management between connected network devices. For example, a first network device may create a port group for a plurality of links directly connected to a second network device, and may select the first network device as a controller network device and the second network device as a worker network device. The first network device may rank the plurality of links of the port group to generate a list of ranked links, and may select, from the list of ranked links, a highest ranked link as a control channel. The first network device may power off one or more of the plurality of links, except the control channel, based on one of a configuration, a policy, or a traffic prediction, and may identify a termination of a time period associated with powering off the one or more of the plurality of links. The first network device may power on the one or more of the plurality of links based on the termination of the time period.

In this way, the implementations provide power optimization using dynamic bandwidth management between connected network devices. For example, a first network device may be directly connected to a second network device via multiple links and interfaces. A bandwidth between the first network device and the second network device may be adjusted based on a traffic rate provided between the first network device and the second network device. The bandwidth may be adjusted by powering off one or more of the multiple links and interfaces based on a configuration, a policy, or a traffic pattern prediction. The powered off links and interfaces may not generate link fault alarms and may be powered on after a predetermined time period or when traffic reaches a threshold level. The powered off links and interfaces may enable the network devices to conserve power during idle states, and may be utilized with aggregated Ethernet (AE) bundles of links. Thus, the first network device and the second network device conserve computing resources, networking resources, and/or the like that would otherwise have been consumed by failing to adjust power consumption and bandwidth of connected network devices based on a traffic rate, failing to power off interfaces of the connected network device during idle states and wasting power with the idle interfaces, failing to power off the idle interfaces during non-peak utilization times of the connected network devices, unnecessarily maintaining the idle interfaces and unused links during non-peak utilization times of the connected network devices, and/or the like.

FIGS. 1A-1E are diagrams of an example 100 associated with power optimization using dynamic bandwidth management between connected network devices. As shown in FIG. 1A, the example 100 includes an endpoint device associated with a network and a server device. The network may include multiple network devices, such as a first network device (e.g., network device 1), a second network device (e.g., network device 2), a third network device (e.g., network device 3), and a fourth network device (e.g., network device 4). A first link (e.g., link 1), a second link (e.g., link 2), a third link (e.g., link 3), and a fourth link (e.g., link 4) may be provided between the first network device and the second network device. A first link (e.g., link 1), a second link (e.g., link 2), a third link (e.g., link 3), and a fourth link (e.g., link 4) may be provided between the third network device and the fourth network device. The first link and the second link between the third network device and the fourth network device may be bundled in a first AE bundle (e.g., AE0), and the third link and the fourth link between the third network device and the fourth network device may be bundled in a second AE bundle (e.g., AE1). In some implementations, the network may provide heterogeneous speeds where one link may be a ten (10) gigabit (G) link, another link may be a one-hundred (100) G link, and/or the like. Further details of the endpoint device, the server device, the network, the network devices, the links, and the AE bundles are provided elsewhere herein.

Figure 1B:
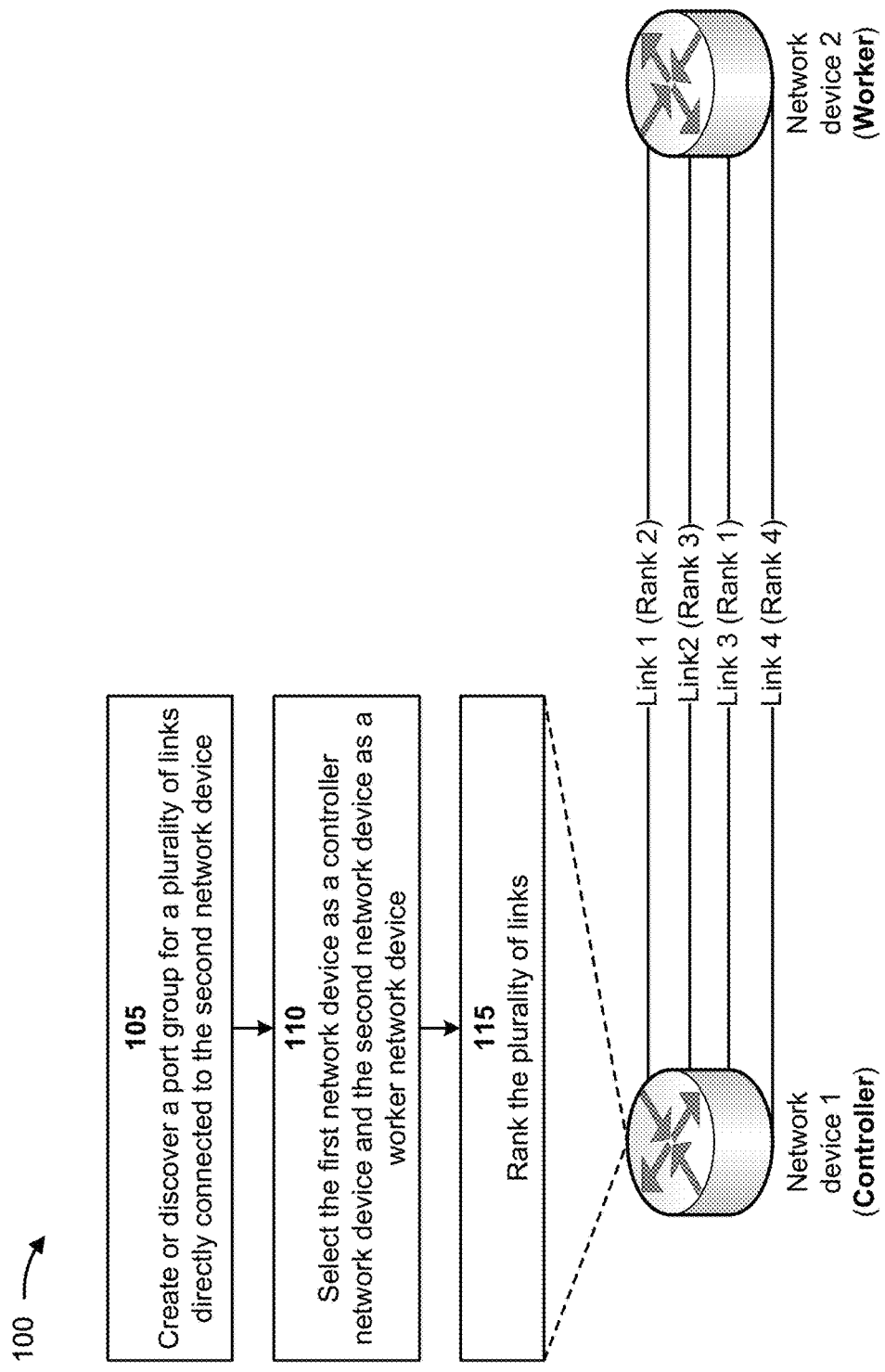

As shown in FIG. 1B, and by reference number 105, the first network device may create or discover a port group for a plurality of links directly connected to the second network device. For example, the first network device may identify the plurality of links (e.g., link 1, link 2, link 3, and link 4) directly connected to the second network device, and may group the plurality of links together in the port group. In some implementations, the first network device may automatically create or discover the port group for the plurality of links by defining a unique key, such as a network identifier (e.g., a media access control (MAC) address) of the first network device, and utilize the unique key to identify the plurality of links directly connected between the first network device and the second network device. Alternatively, a user may configure the port group for the plurality of links directly connected to the second network device. In some implementations, these principles may be applied to arrangements that include only physical links, multiple AE bundles of links, a combination of physical links and AE bundles, and/or the like.

As further shown in FIG. 1B, and by reference number 110, the first network device may select the first network device as a controller network device and the second network device as a worker network device. For example, the first network device may select the first network device as the controller network device and the second network device as the worker network based on a user input. The controller network device may control power management of the port group for the controller network device and the worker network device, and may ignore a power management configuration of the worker network device (if any). In some implementations, the first network device may receive (e.g., from a user) an input indicating that the first network device is to be designated as the controller network device and that the second network device is to be designated as the worker network device.

In some implementations, the first network device may select the first network device as the controller network device and the second network device as the worker network device based on network identifiers (e.g., unique keys) associated with the first network device and the second network device. For example, the network identifier of the first network device may be a first MAC address of the first network device, and the network identifier of the second network device may a second MAC address of the second network device. The first network device may be aware of the second MAC address, and the second network device may be aware of the first MAC address (e.g., via the link layer discovery protocol (LLDP)). In some implementations, if the first MAC address of the first network device is higher than the second MAC address of the second network device, the first network device may be designated as the controller network device and the second network device may be designated as the worker network device.

As further shown in FIG. 1B, and by reference number 115, the first network device may rank the plurality of links. For example, the first network device (e.g., as the controller network device) may rank the plurality of links of the port group to generate a list of ranked links based on network identifiers associated with the plurality of links. In some implementations, the network identifiers may include local MAC addresses (e.g., unique identifiers) of the plurality of links, and the first network device may rank the plurality of links based on the local MAC addresses. The second network device (e.g., as the worker network device) may rank the plurality of links based on remote MAC addresses of the plurality of links. The list of ranked links may include a highest ranked link, a next highest ranked link, intermediate ranked links, a next lowest ranked link, and a lowest ranked link. As described elsewhere herein, the first network device may select the lowest ranked link as a first link to power off in order to conserve energy at the first network device and the second network device. In some implementations, the first network device may power off links based on the list of ranked links (e.g., with the lowest ranked links being powered off first) in order to conserve energy at the first network device and the second network device.

Figure 1C:
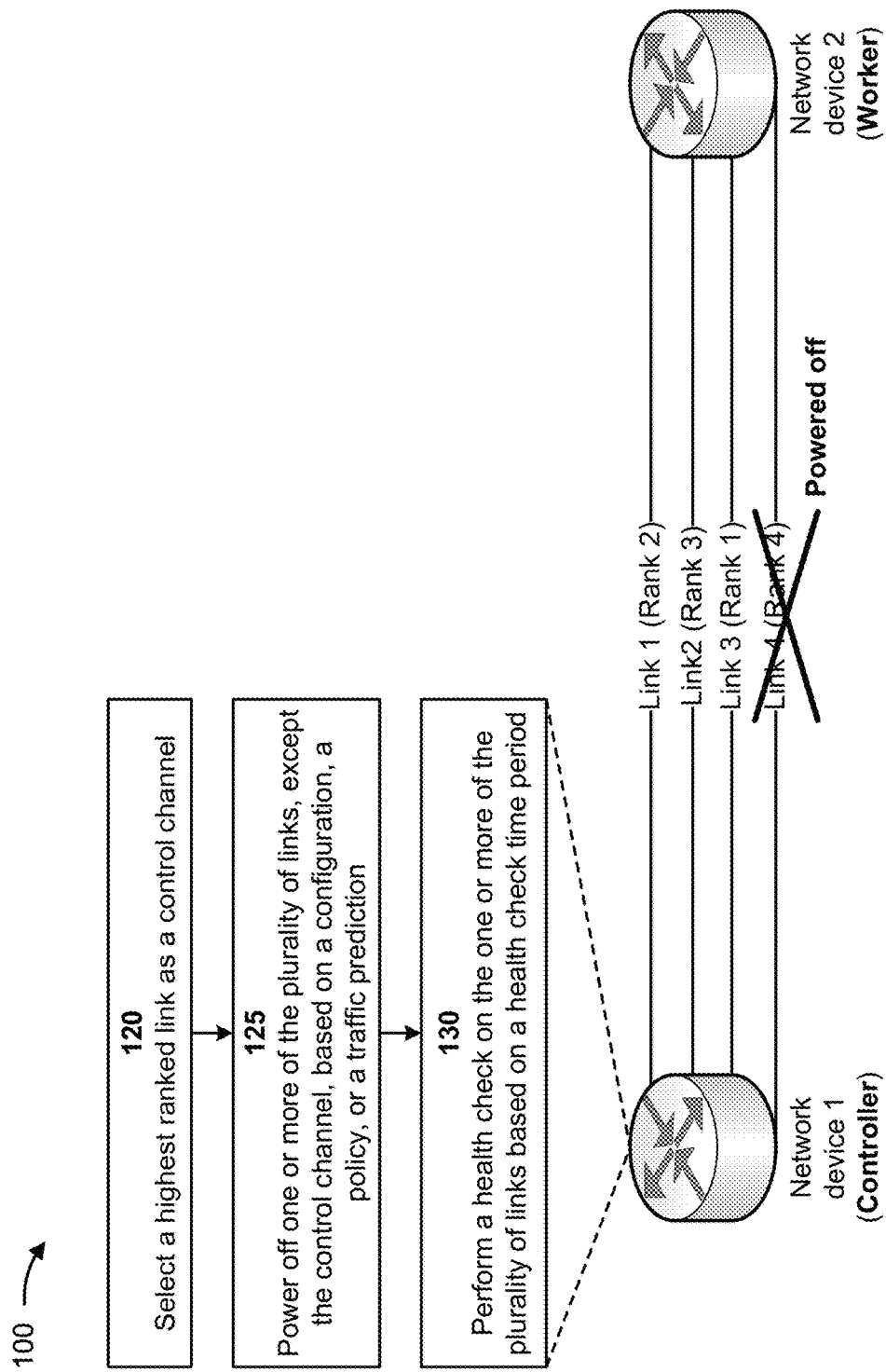

As shown in FIG. 1C, and by reference number 120, the first network device may select a highest ranked link as a control channel. For example, the first network device may select the highest ranked link, in the list of ranked links, as a primary link or a control channel with the second network device. The first network device may utilize the control channel to exchange protocol messages with the second network device. In some implementations, the first network device may determine that the highest ranked link (e.g., the control channel) is disabled (e.g., for a fault or another reason), and may select, from the list of ranked links, a next highest ranked link as the control channel. In some implementations, a non-control channel link may fail and the first network device may determine that the non-control channel link is disabled. For example, link 1, link 2, link 3, and link 4 may be part of the same power-group, and link 1 may be the control channel. Link 3 and link 4 may be in power-off state to save power, and link 2 may fail. In such an example, the first network device may enable (e.g., power on) either link 3 or link 4 to maintain link resiliency and a minimum bandwidth.

As further shown in FIG. 1C, and by reference number 125, the first network device may power off one or more of the plurality of links, except the control channel, based on a configuration, a policy, or a traffic prediction. For example, the first network device may power off one or more of the plurality of links, except the control channel, based on a user configuration. In some implementations, the configuration may include attributes associated with powering off the one or more of the plurality of links. A user of the first network device (e.g., a network manager) may directly configure the attributes of the configuration. An example configuration may include the following information:

```
set interface power-nap-group PN0 {
    Interfaces link 1, link 2, link 3, and link 4;
    role {controller or worker or automatic}
    bandwidth <X%>
    start-time <Time>
    duration <Y sec>
    roll-back-bandwidth <Z%>
    health-check-interval <N sec>
}.
```

In one example, the configuration may reduce a bandwidth of the first network device by 25% between 10:00 PM to 7:00 AM based on the following information:
set interface power-nap-group PN0 role controller;
set interface power-nap-group PN0 interfaces link 1, link 2, link 3, and link 4;
set interface power-nap-group PN0 bandwidth 25% start-time 10:00 PM duration 32400 seconds
set interface power-nap-group PN0 roll-back-bandwidth 50%
set interface power-nap-group PN0 health-check-interval 30 minutes.
In such an example, if one of the member links is already down due to a fault or any other reason, the first network device may not apply the configuration since the bandwidth is already at 75%.

Alternatively, the first network device may power off one or more of the plurality of links, except the control channel, based on a policy. In some implementations, the policy may include conditions associated with powering off the one or more of the plurality of links. For example, a user may configure the conditions of the policy and the first network device may apply the policy when the conditions are satisfied. An example policy may include the following information:

```
set interface power-nap-group PN5 {
    Interfaces link 1, link 2, link 3, and link 4;
    role {controller or worker or automatic}
    health-check-interval 20 minutes
    power-saving-policy {
        rules {condition 1, 2, 3... }
        actions {Power-nap bandwidth X% duration Y sec}
        roll-back-rules {condition a, b, c... }
} } }.
```

In one example, if transmission and reception bandwidth utilization of the first network device is less than 10% for 60 minutes, the policy may reduce bandwidth of the first network device by 25% and for 100 minutes. The roll-back rules may include a rule requiring the bandwidth utilization to be more than 50% of the available bandwidth. During the health check, the first network device may power on a link or a laser on both ends for the health check interval (e.g., twenty minutes) to ensure that the link is healthy. The first network device may generate an alarm if the link is not healthy.

Alternatively, the first network device may power off one or more of the plurality of links, except the control channel, based on a traffic prediction associated with the first network device and the second network device. In some implementations, the traffic prediction may be generated by a machine learning model associated with the first network device and/or the second network device.

As further shown in FIG. 1C, and by reference number 130, the first network device may perform a health check on the one or more of the plurality of links based on a health check time period. For example, the first network device may determine a health check time period associated with performing a health check on the one or more of the plurality of links that are powered off. During the health check, the first network device may power on the one or more of the plurality of links at every health check time period to ensure that the one or more of the plurality of links are healthy. The first network device may generate an alarm if the one or more of the plurality of links are not healthy.

Figure 1D:
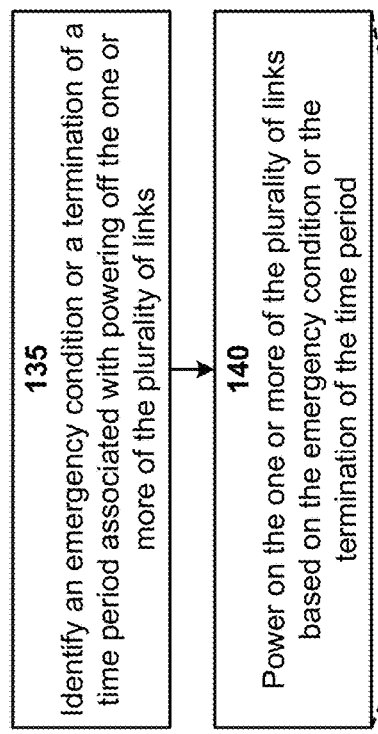
Figure 1D:
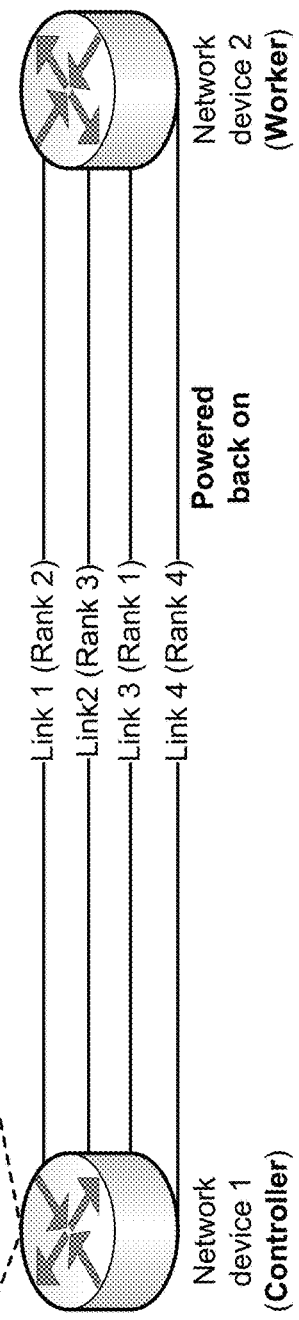

As shown in FIG. 1D, and by reference number 135, the first network device may identify an emergency condition or a termination of a time period associated with powering off the one or more of the plurality of links. For example, the first network device may identify an emergency condition, such as an unexpected increase in traffic at the first network device, a sudden burst of traffic at the first network device, a failure of an active link associated with the first network device, and/or the like. The emergency condition may require the first network device to rollback the powering off of the one or more of the plurality of links in order to manage the emergency condition. In one example, a rollback may be necessary when an aggregated bandwidth of the first network device exceeds 50%. Alternatively, an emergency condition may not occur (e.g., a rollback is unnecessary) and the time period associated with powering off the one or more of the plurality of links may eventually expire. The first network device may identify the termination of a time period associated with powering off the one or more of the plurality of links.

As further shown in FIG. 1D, and by reference number 140, the first network device may power on the one or more of the plurality of links based on the emergency condition or the termination of the time period. For example, when the emergency condition is identified, the first network device may rollback the powering off of the one or more of the plurality of links by powering on the one or more of the plurality of links. The first network device may utilize the one or more of the plurality of links to manage the emergency condition. In one example, when rollback is necessary, the first network device may instruct the second network device to power on the one or more of the plurality of links, and the first network device and the second network device may power on the one or more of the plurality of links. The first network device may reenable link fault alarms and may stop the health check time period and the time period associated with powering off the one or more of the plurality of links. Alternatively, when the termination of the time period is identified, the first network device may power on the one or more of the plurality of links. In one example, when rollback is not necessary, the first network device may instruct the second network device to power on the one or more of the plurality of links, and the first network device and the second network device may power on the one or more of the plurality of links. The first network device may reenable link fault alarms and may stop the health check time period and the time period associated with powering off the one or more of the plurality of links.

In an example implementation, the first network device may include the following example configuration:
- set interface power-nap-group PN4 role automatic;
- set interface power-nap-group PN4 interfaces link 1, link 2, link 3, and link 4;
- set interface power-nap-group PN4 bandwidth 25% start-time 10:00 PM duration 32400 seconds
- set interface power-nap-group PN4 roll-back-bandwidth 50%
- set interface power-nap-group PN4 health-check-interval 30 minutes.

The first network device may be designated as the controller network device and the second network device may be designated as the worker network device (e.g., since a MAC address of the first network device is higher than a MAC address of the second network device). The first network device may identify link 3 as a highest ranked link and may designate link 3 as a control channel. Each of the four links may represent 25% of the port group's aggregated bandwidth. At 10:00 PM, the first network device may instruct the second network device to power off link 4 for 32,400 seconds. If the aggregated bandwidth consumption on the other three links is less than 50%, the second network device may acknowledge the instruction and the first network device and the second network device may disable link fault alarms and power off link 4. The first network device may start two timers, a 32,400 second timer (time period for power off) and an 1800 second timer (health check time period). The first network device may perform a health check of link 4 after expiration of the health check time period and may generate an alarm if necessary. The first network device may continue to monitor the bandwidth on the port group. A rollback may be necessary at 2:00 AM and when the aggregated bandwidth of the port group exceeds 50%. The first network device may perform the rollback to power on link 4, may reenable link fault alarms for link 4, and may cease all timers. A rollback may not be necessary when the aggregated bandwidth of the port group is less than 50% during the time period for power off. At 7:00 AM, first network device may power on link 4, may reenable link fault alarms for link 4, and may cease all timers.

In some implementations, the first network device and the second network device may provide high availability even during a power off of links. For example, the first network device may reboot during a power off of the links, may save the power-related information (e.g., power group and members, a name of a member link that is currently in a power off state, a power off start time, a duration of a power off, alarms, and/or the like) in a persistent database, and/or the like.

Figure 1E:
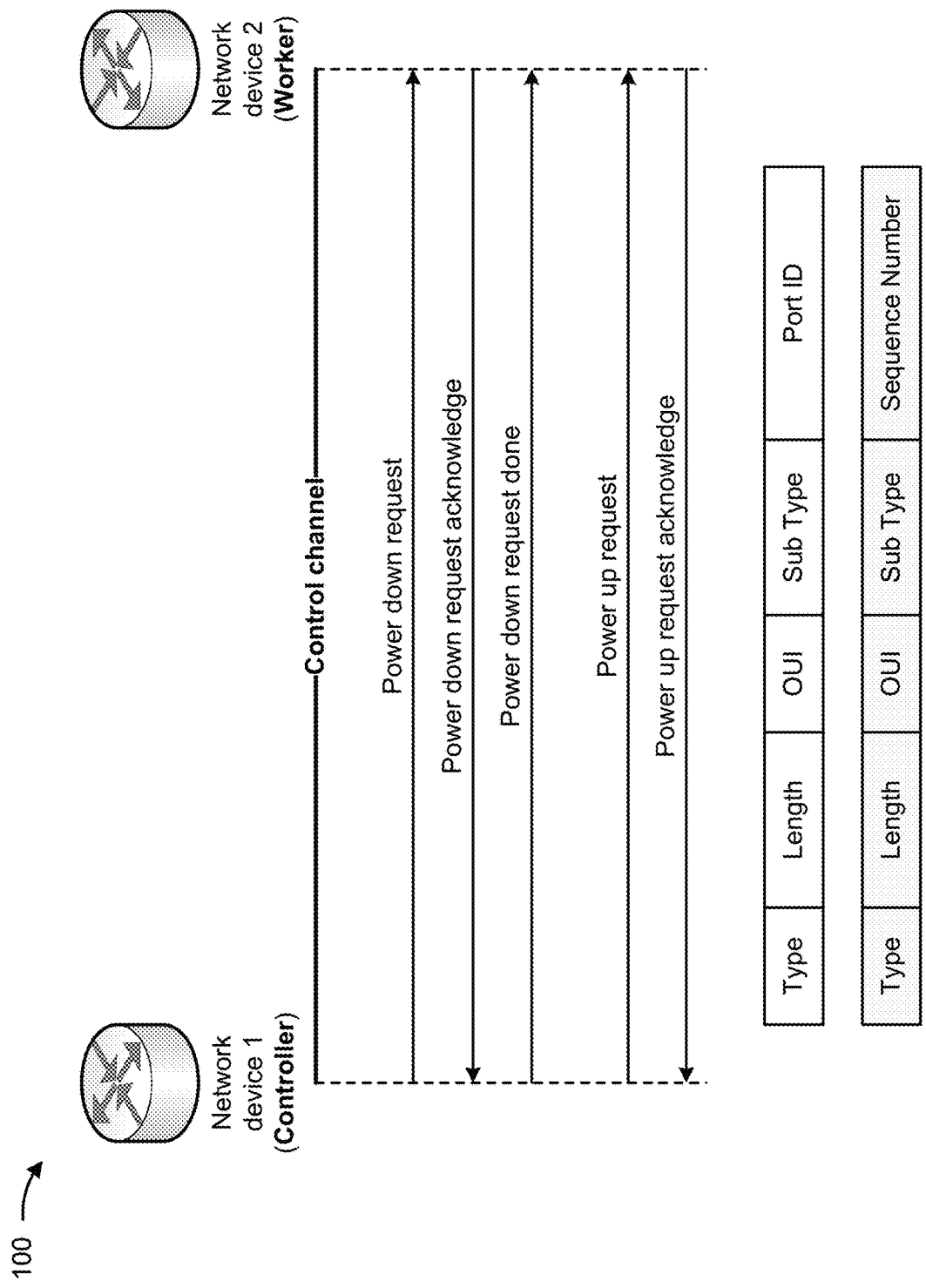

FIG. 1E depicts an example of protocol exchange messages between the first network device and the second network device, via the control channel. As shown, the power down sequence may be a three-way handshake that includes a power down request (e.g., port identifier and sequence number), a power down request acknowledgement (e.g., a port identifier and a sequence number), and a power down done message (e.g., port identifier and sequence number). The power up sequence may be a two-way handshake that includes a power up request (e.g., port identifier and sequence number) and a power up request acknowledgement (e.g., a port identifier and a sequence number). As further shown in FIG. 1E, the power down and power up messages may include a type field, a length field, an organizationally unique identifier (OUI) field, a sub type field, and a port identifier (ID) or a sequence number. The sub type field may include subtypes, such as a power down request, a power down request acknowledgment, a power down request done, a power up request, and a power up request acknowledgment.

In this way, the implementations provide power optimization using dynamic bandwidth management between connected network devices. For example, a first network device may be directly connected to a second network device via multiple links and interfaces. A bandwidth between the first network device and the second network device may be adjusted based on a traffic rate provided between the first network device and the second network device. The bandwidth may be adjusted by powering off one or more of the multiple links and interfaces based on a configuration, a policy, or a traffic pattern prediction. The powered off links and interfaces may not generate link fault alarms and may be powered on after a predetermined time period or when traffic reaches a threshold level. The powered off links and interfaces may enable the network devices to conserve power during idle states, and may be utilized with AE bundles of links. Thus, the first network device and the second network device conserve computing resources, networking resources, and/or the like that would otherwise have been consumed by failing to adjust power consumption and bandwidth of connected network devices based on a traffic rate, failing to power off interfaces of the connected network device during idle states and wasting power with the idle interfaces, failing to power off the idle interfaces during non-peak utilization times of the connected network devices, unnecessarily maintaining the idle interfaces and unused links during non-peak utilization times of the connected network devices, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
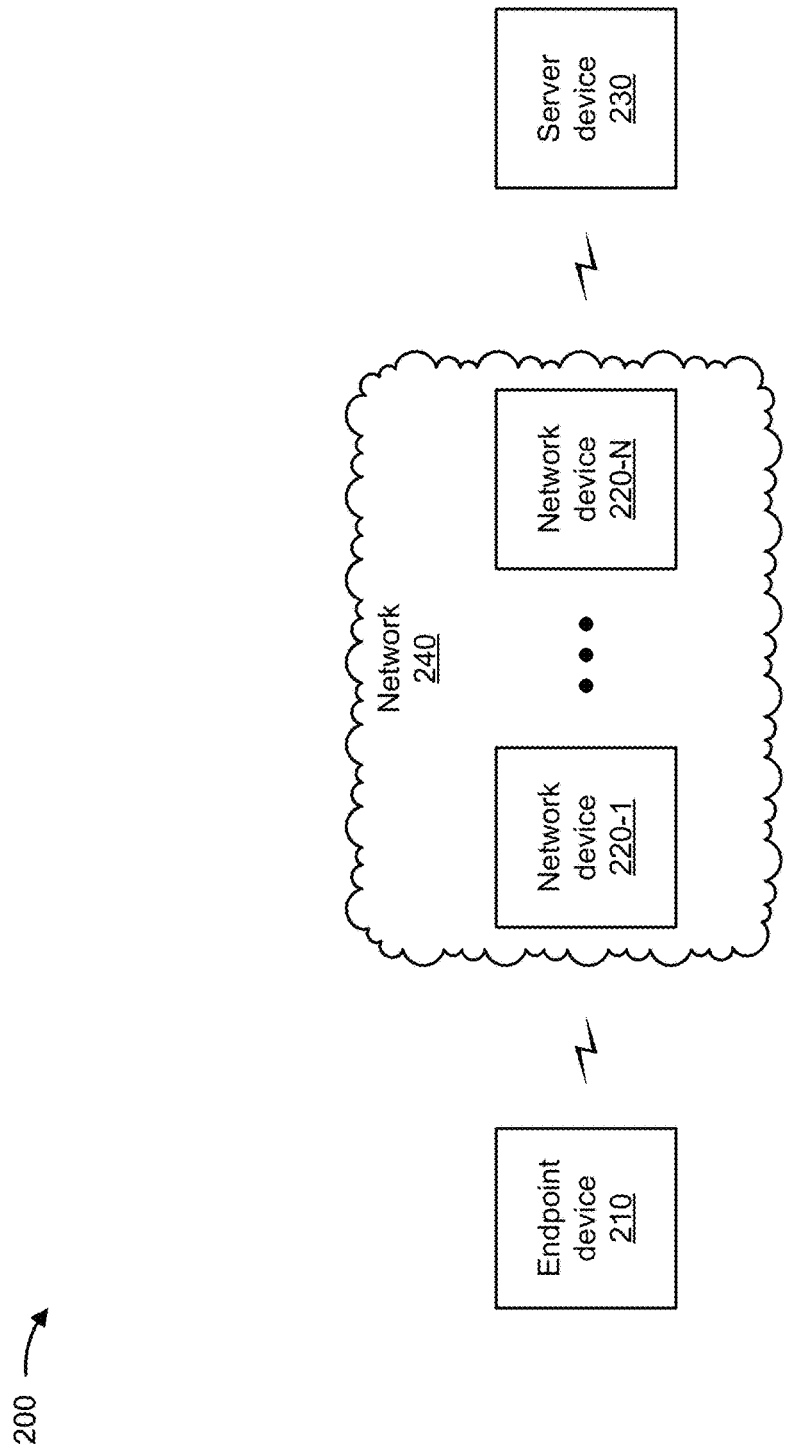
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an endpoint device 210, a group of network devices 220 (shown as network device 220-1 through network device 220-N), a server device 230, and a network 240. Devices of the environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, a server device, a group of server devices, or a similar type of device. In some implementations, the endpoint device 210 may receive network traffic from and/or may provide network traffic to other endpoint devices 210 and/or the server device 230, via the network 240 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 240.

The server device 230 may include one or more devices capable of receiving, generating, storing, processing, providing, and/or routing information, as described elsewhere herein. The server device 230 may include a communication device and/or a computing device. For example, the server device 230 may include a server, such as an application server, a client server, a web server, a database server, a host server, a proxy server, a virtual server (e.g., executing on computing hardware), or a server in a cloud computing system. In some implementations, the server device 230 may include computing hardware used in a cloud computing environment.

The network 240 includes one or more wired and/or wireless networks. For example, the network 240 may include a packet switched network, a cellular network (e.g., a fifth generation (5G) network, a fourth generation (4G) network, such as a long-term evolution (LTE) network, a third generation (3G) network, a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
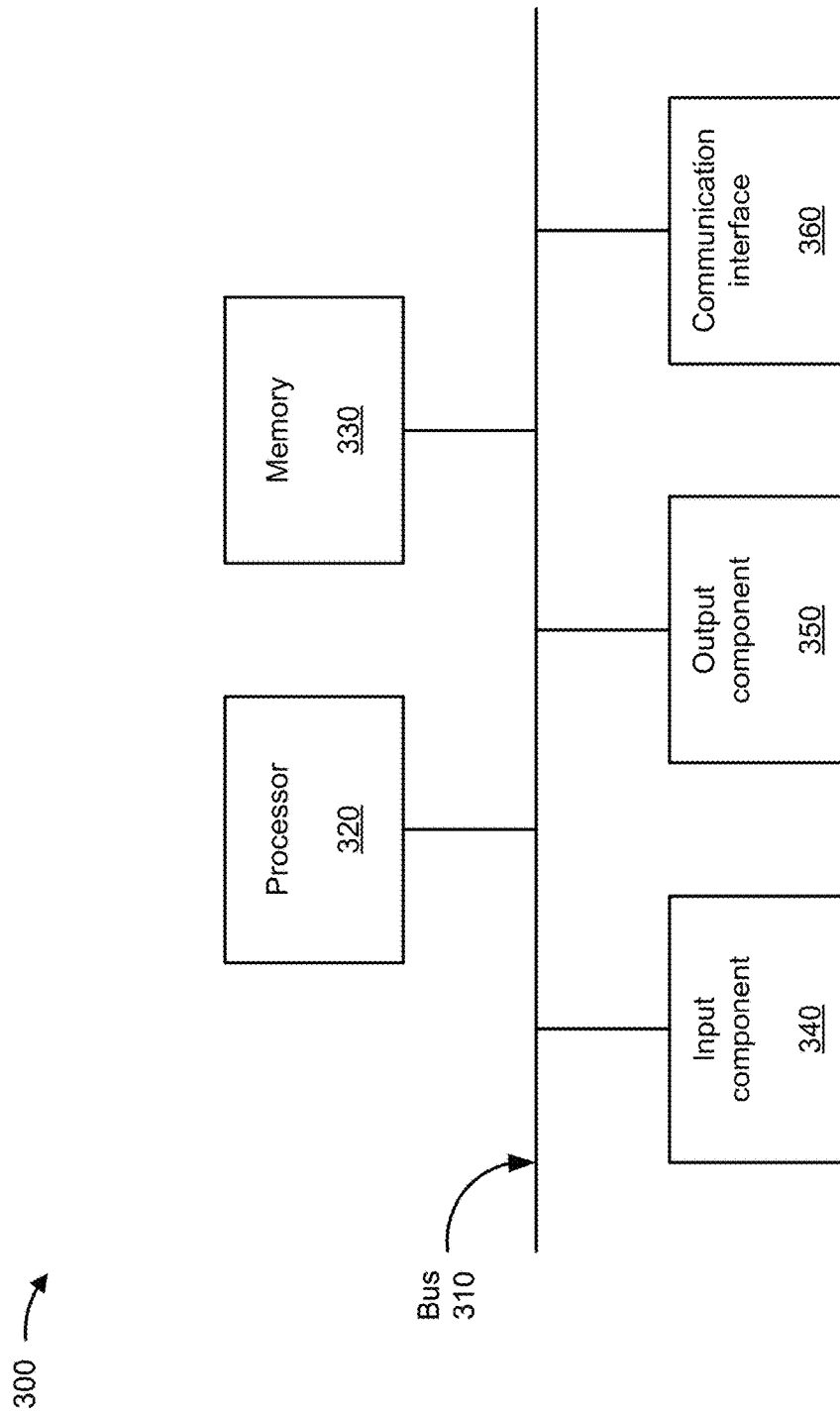
FIGS. 3 and 4 are diagrams of example components of one or more devices of FIG. 2.

FIG. 3 is a diagram of example components of one or more devices of FIG. 2. The example components may be included in a device 300, which may correspond to the endpoint device 210, the network device 220, and/or the server device 230. In some implementations, the endpoint device 210, the network device 220, and/or the server device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
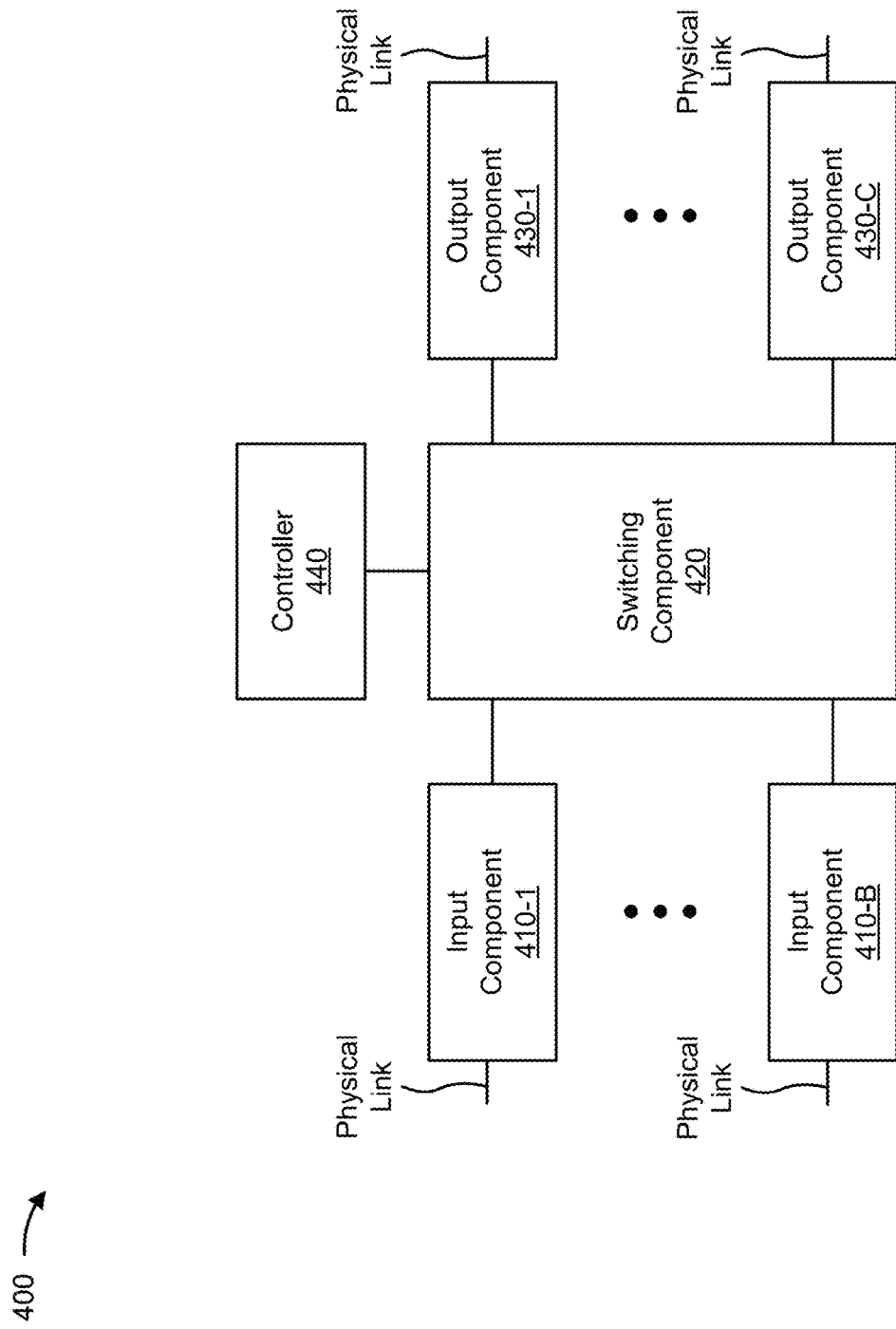

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
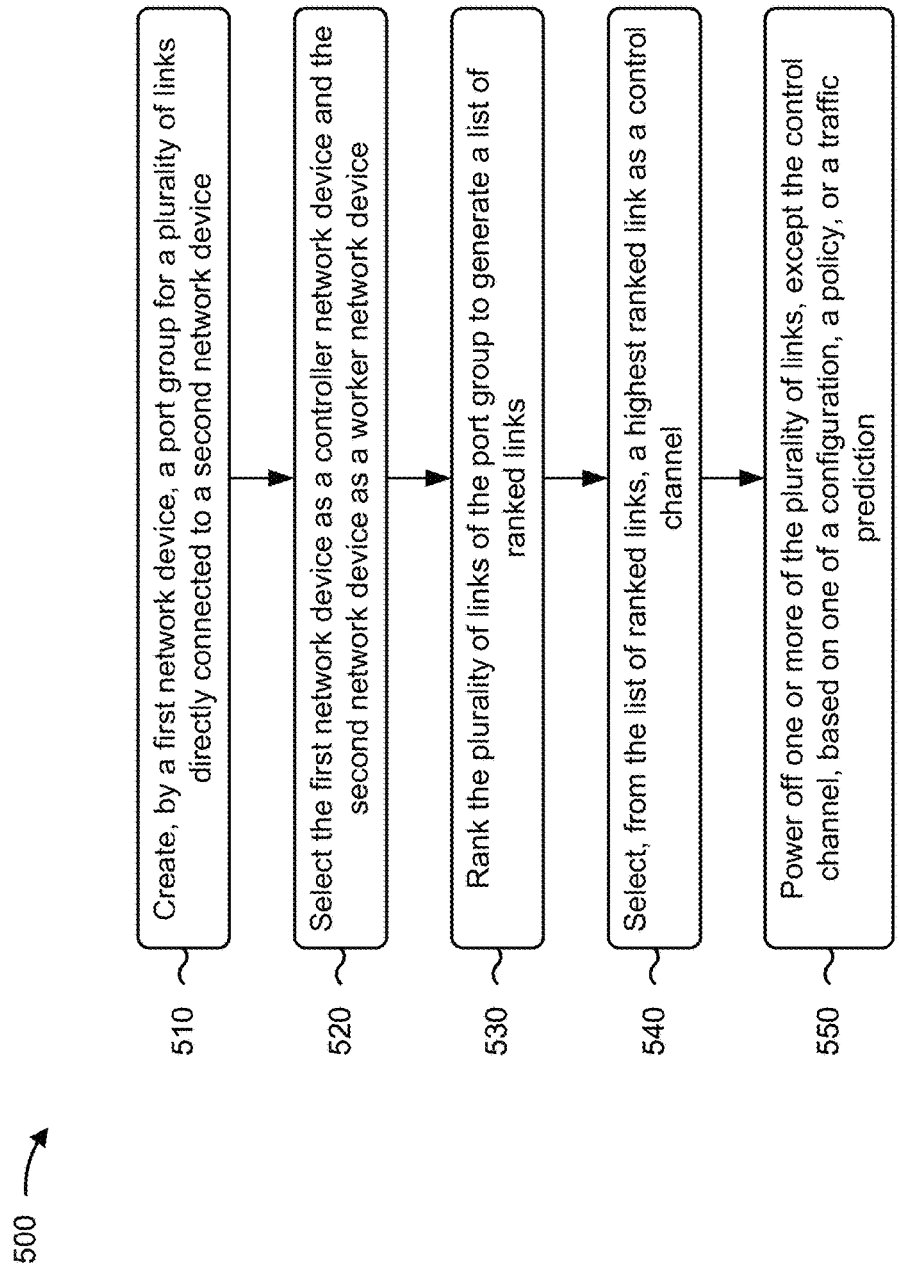
FIG. 5 is a flowchart of an example process for power optimization using dynamic bandwidth management between connected network devices.

FIG. 5 is a flowchart of an example process 500 for power optimization using dynamic bandwidth management between connected network devices. In some implementations, one or more process blocks of FIG. 5 may be performed by a network device (e.g., the network device 220). In some implementations, one or more process blocks of FIG. 5 may be performed by another device or a group of devices separate from or including the network device, such as an endpoint device (e.g., the endpoint device 210) and/or a server device (e.g., the server device 230). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include creating a port group for a plurality of links directly connected to a second network device (block 510). For example, the first network device may create a port group for a plurality of links directly connected to a second network device, as described above. In some implementations, creating the port group for the plurality of links includes one of utilizing a user configuration to create the port group for the plurality of links, or automatically creating the port group for the plurality of links.

As further shown in FIG. 5, process 500 may include selecting the first network device as a controller network device and the second network device as a worker network device (block 520). For example, the first network device may select the first network device as a controller network device and the second network device as a worker network device, as described above. In some implementations, selecting the first network device as the controller network device and the second network device as the worker network device includes one of selecting the first network device as the controller network device and the second network device as the worker network device based on a user input, or selecting the first network device as the controller network device and the second network device as the worker network device based on network identifiers associated with the first network device and the second network device.

As further shown in FIG. 5, process 500 may include ranking the plurality of links of the port group to generate a list of ranked links (block 530). For example, the first network device may rank the plurality of links of the port group to generate a list of ranked links, as described above. In some implementations, ranking the plurality of links of the port group to generate the list of ranked links includes ranking the plurality of links of the port group to generate the list of ranked links based on network identifiers associated with the plurality of links.

As further shown in FIG. 5, process 500 may include selecting, from the list of ranked links, a highest ranked link as a control channel (block 540). For example, the first network device may select, from the list of ranked links, a highest ranked link as a control channel, as described above. In some implementations, the first network device and the second network device utilize the control channel for protocol message exchange.

As further shown in FIG. 5, process 500 may include powering off one or more of the plurality of links, except the control channel, based on one of a configuration, a policy, or a traffic prediction (block 550). For example, the first network device may power off one or more of the plurality of links, except the control channel, based on one of a configuration, a policy, or a traffic prediction, as described above. In some implementations, the configuration includes attributes associated with powering off the one or more of the plurality of links. In some implementations, the policy includes conditions associated with powering off the one or more of the plurality of links. In some implementations, the traffic prediction is generated by a machine learning model associated with the first network device. In some implementations, powering off the one or more of the plurality of links includes powering off the one or more of the plurality of links based on rankings of the plurality of links provided in the list of ranked links.

In some implementations, process 500 includes performing a health check on the one or more of the plurality of links based on a health check time period. In some implementations, process 500 includes identifying an emergency condition, and powering on the one or more of the plurality of links based on the emergency condition. In some implementations, process 500 includes identifying a termination of a time period associated with powering off the one or more of the plurality of links, and powering on the one or more of the plurality of links based on the termination of the time period. In some implementations, process 500 includes determining that the highest ranked link is disabled, and selecting, from the list of ranked links, a next highest ranked link as the control channel.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   creating, by a first network device, a port group for a plurality of links directly connected to a second network device;
   selecting, by the first network device, the first network device as a controller network device and the second network device as a worker network device;
   ranking, by the first network device, the plurality of links of the port group to generate a list of ranked links;
   selecting, by the first network device and from the list of ranked links, a highest ranked link as a control channel; and
   powering off, by the first network device, one or more of the plurality of links, except the control channel, based on one of a configuration, a policy, or a traffic prediction.

2. The method of claim 1, further comprising:
   performing a health check on the one or more of the plurality of links based on a health check time period.

3. The method of claim 1, further comprising:
   identifying an emergency condition; and
   powering on the one or more of the plurality of links based on the emergency condition.

4. The method of claim 1, further comprising:
   identifying a termination of a time period associated with powering off the one or more of the plurality of links; and
   powering on the one or more of the plurality of links based on the termination of the time period.

5. The method of claim 1, wherein creating the port group for the plurality of links comprises one of:
   utilizing a user configuration to create the port group for the plurality of links; or
   automatically creating the port group for the plurality of links.

6. The method of claim 1, wherein selecting the first network device as the controller network device and the second network device as the worker network device comprises one of:
   selecting the first network device as the controller network device and the second network device as the worker network device based on a user input; or
   selecting the first network device as the controller network device and the second network device as the worker network device based on network identifiers associated with the first network device and the second network device.

7. The method of claim 1, wherein ranking the plurality of links of the port group to generate the list of ranked links comprises:
   ranking the plurality of links of the port group to generate the list of ranked links based on network identifiers associated with the plurality of links.

8. A first network device, comprising:
   one or more memories; and
   one or more processors to:
      create a port group for a plurality of links directly connected to a second network device;
      select the first network device as a controller network device and the second network device as a worker network device;
      rank the plurality of links of the port group to generate a list of ranked links;
      select, from the list of ranked links, a highest ranked link as a control channel;
      power off one or more of the plurality of links, except the control channel, based on one of a configuration, a policy, or a traffic prediction; and
      perform a health check on the one or more of the plurality of links based on a health check time period.

9. The first network device of claim 8, wherein the first network device and the second network device utilize the control channel for protocol message exchange.

10. The first network device of claim 8, wherein the one or more processors are further to:
    determine that the highest ranked link is disabled; and
    select, from the list of ranked links, a next highest ranked link as the control channel.

11. The first network device of claim 8, wherein the one or more processors, to power off the one or more of the plurality of links, are to:
    power off the one or more of the plurality of links based on rankings of the plurality of links provided in the list of ranked links.

12. The first network device of claim 8, wherein the configuration includes attributes associated with powering off the one or more of the plurality of links.

13. The first network device of claim 8, wherein the policy includes conditions associated with powering off the one or more of the plurality of links.

14. The first network device of claim 8, wherein the traffic prediction is generated by a machine learning model associated with the first network device.

15. A non-transitory computer-readable medium storing a set of instructions, the set of instructions comprising:
one or more instructions that, when executed by one or more processors of a first network device, cause the first network device to:
create a port group for a plurality of links directly connected to a second network device;
select the first network device as a controller network device and the second network device as a worker network device;
rank the plurality of links of the port group to generate a list of ranked links;
select, from the list of ranked links, a highest ranked link as a control channel;
power off one or more of the plurality of links, except the control channel, based on one of a configuration, a policy, or a traffic prediction;
identify a termination of a time period associated with powering off the one or more of the plurality of links; and
power on the one or more of the plurality of links based on the termination of the time period.

16. The non-transitory computer-readable medium of claim 15, wherein the one or more instructions further cause the first network device to:
perform a health check on the one or more of the plurality of links based on a health check time period.

17. The non-transitory computer-readable medium of claim 15, wherein the one or more instructions further cause the first network device to:
identify an emergency condition; and
power on the one or more of the plurality of links based on the emergency condition.

18. The non-transitory computer-readable medium of claim 15, wherein the one or more instructions, that cause the first network device to create the port group for the plurality of links, cause the first network device to one of:
utilize a user configuration to create the port group for the plurality of links; or
automatically create the port group for the plurality of links.

19. The non-transitory computer-readable medium of claim 15, wherein the one or more instructions, that cause the first network device to rank the plurality of links of the port group to generate the list of ranked links, cause the first network device to:
rank the plurality of links of the port group to generate the list of ranked links based on network identifiers associated with the plurality of links.

20. The non-transitory computer-readable medium of claim 15, wherein the one or more instructions further cause the first network device to:
determine that the highest ranked link is disabled; and
select, from the list of ranked links, a next highest ranked link as the control channel.

* * * * *